R. E. TEAGUE.
FRUIT GATHERER.
APPLICATION FILED JULY 18, 1918.
1,302,243.
Patented Apr. 29, 1919.
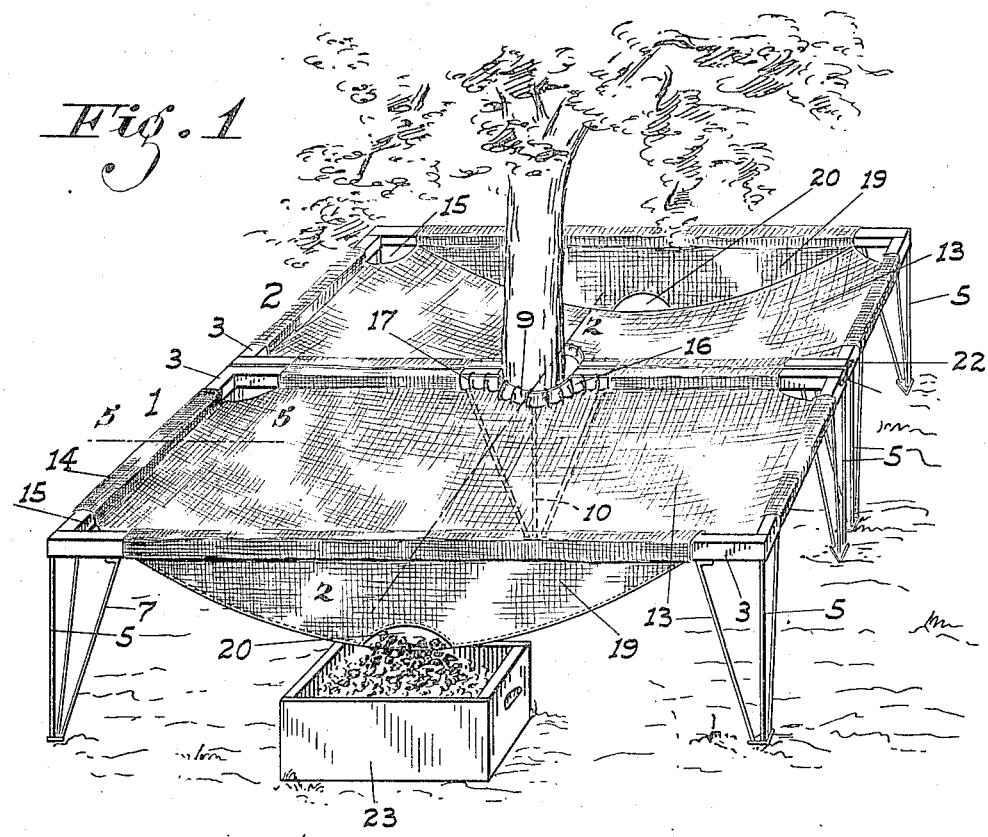
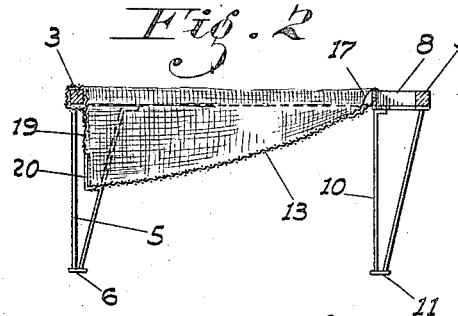
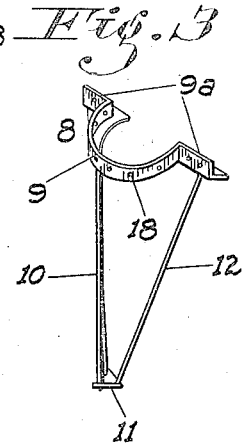
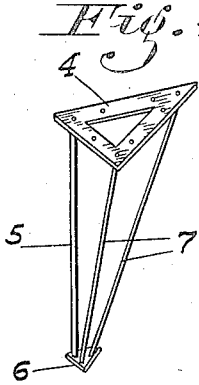
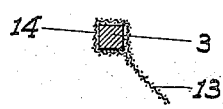
INVENTOR.
Raleigh E. Teague
BY
ATTORNEY

UNITED STATES PATENT OFFICE.

RALEIGH E. TEAGUE, OF HANFORD, CALIFORNIA.

FRUIT-GATHERER.

1,302,243.   Specification of Letters Patent.   Patented Apr. 29, 1919.

Application filed July 18, 1918. Serial No. 245,454.

*To all whom it may concern:*

Be it known that I, RALEIGH E. TEAGUE, a citizen of the United States, residing at Hanford, in the county of Kings, State of California, have invented certain new and useful Improvements in Fruit-Gatherers; and I do declare the following to be a full, clear, and exact description of the same, reference being had to the accompanying drawings, and to the characters of reference marked thereon, which form a part of this application.

This invention relates to improvements in fruit gatherers or harvesters, the principal object thereof being to provide an easily positioned and removable device which will be placed under a fruit tree of which the fruit is to be harvested whereby the fruit when shaken down will automatically pass from the device into the fruit boxes suitably positioned under the device for that purpose.

A further object is to produce a device on which the fruit will fall without the danger of the same being bruised or coming in contact with the ground. This saves fruit and conserves manual labor.

The device is of course particularly adapted for use with perishable or easily bruised fruits, such as peaches, prunes, apricots and the like.

A third object has been to produce a device for the purpose as above stated which will be simple of construction and operation, and yet extremely efficient for the purpose for which it is designed.

These objects I accomplish by means of such structure and relative arrangement of parts as will fully appear by a perusal of the following specification and claims.

On the drawings similar characters of reference indicate corresponding parts in the several views.

Figure 1 is an elevation in perspective of the device as positioned around a fruit tree.

Fig. 2 is a sectional view taken on a line 2—2 of Fig. 1.

Fig. 3 is a perspective view of a central frame support.

Fig. 4 is a perspective view of a corner frame support.

Fig. 5 is a fragmentary section taken on a line 5—5 of Fig. 1.

Referring now more particularly to the figures of reference on the drawings, the device consists essentially of two independent members 1 and 2 abutting against each other to surround the trunk of a fruit tree and being of sufficient size to extend beyond the bearing limbs of the tree.

These members are rectangular in shape, each one being substantially half of a square on a horizontal plane.

As the construction of both members is identical, I have therefore hereinafter described but one of them to avoid unnecessary duplication of description.

Taking the member 1 as the one particularly described, the same consists of a wooden frame 3, under each corner of which is secured a right angled triangular iron plate 4. A leg 5 is secured to and depends downwardly from the apex of the triangular plate a suitable distance, being secured at its lower end on a small triangular ground bearing plate 6. From this plate brace rods 7 extend to the 45° corners of the plate 4.

This construction provides a rigid support for the frame, and also braces the same against twisting out of square.

The edge of the frame 3 which abuts against that of the member 2 is cut away for a suitable distance on either side of the center, and a member 8 consisting of a central semicircular portion 9 having flanges 9ª on either side thereof is interposed to project inwardly between these cut ends of the frame 3. This member 8 and the flanges thereon are preferably bent out of one piece of angle iron, so that the ends of the wooden frame 3 may rest on and be secured thereto. A leg 10 depends centrally from the portion 9 terminating at and secured on a plate 11 from which braces 12 extend to the edges of the flanges 9ª, forming a central supporting means of an inverted tripod form substantially the same as the members 5—6—7, and of the same height from the ground, which height may be as best suited for the purpose.

The semicircular portion 9 of the member 8 and its complement on the member 2 is of sufficient diameter to circumvent the trunk of any ordinary fruit tree.

A canvas fruit retainer 13 covers the space inside the frame 3, the same having wide hems 14 along its back edge and the two sides, so that the wooden frame members may be slipped therethrough.

The corners of the canvas are cut away as at 15 and centrally of the back edge as at 16, as the hem could not pass the corner plates 4 and the legs thereon nor the member 8. The canvas is of course cut to conform to the center of the member 8, and is held in position at that point by loop stitching 17, the member 8 being provided with holes 18 in the side thereof for that purpose.

The canvas 13 is so shaped and hung on the frame 3 that while the back edge (which is adjacent the tree) and the sides are on a level with the bottom of the frame, the front edge sags down from both side edges toward the center and is sewed along this front edge to the bottom edge of a separate piece of canvas 19 hung vertically, which lower edge conforms to the contour of the sag of the main canvas.

The lower edge of the canvas 19 is cut away centrally thereof to form an orifice 20 of sufficient size to admit of a certain quantity of fruit passing therethrough.

The top edge of this canvas has a wide hem to permit of the front edge of the frame 3 passing therethrough.

Hooks 21 on the outer edges of the frame 3 engage with eyes 22 on the adjacent edges of the frame of the member 2 to hold the two members together while the device is being utilized.

In the operation of the device, when the tree is shaken the fruit drops onto the canvases 13, and without any tilting or shaking of the frames rolls down toward the lowest point and out through the orifice 20 into boxes 23 positioned thereunder.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A fruit gatherer comprising a pair of rectangular frames adapted to abut and be demountably connected at their abutting edges to surround the trunk of a fruit tree, supporting means secured to the frames, a canvas secured to three sides of each of the frames, such canvas sagging down from the sides toward the center and having its lowest point on the vertical plane of the edge of the frame farthest from the abutting edge and central thereof, and a canvas secured to and hung vertically from said farthest edge, the lower edge of said last named canvas conforming in shape to the sagged edge of the first named canvas and being secured thereto, and being provided with an orifice centrally positioned along the lower edge thereof.

2. A fruit gatherer comprising a pair of independent rectangular frames of equal size to form a square when abutting one against the other, brace plates under each corner of each frame, legs depending from the plates, a centrally positioned semicircular piece projecting inwardly from the abutting edges of the frames and adapted to surround the trunk of a fruit tree, and canvases hung on the frames with their lowest points on the vertical plane of the edges of the frames farthest from the tree, and central thereof, the canvases being each provided with an orifice at such lowest points for the passage of the fruit therethrough.

In testimony whereof I affix my signature in presence of two witnesses.

RALEIGH E. TEAGUE.

Witnesses:
 EDWARD MANGER,
 M. SHERWOOD.

Copies of this patent may be obtained for five cents each, by addressing the "Commissioner of Patents, Washington, D. C."